Patented Jan. 31, 1939

2,145,579

UNITED STATES PATENT OFFICE 2,145,579

HETEROCYCLIC AZO DERIVATIVES

Arthur Binz, Berlin-Wilmersdorf, and Otto von Schickh, Berlin, Germany, assignors to Schering-Kahlbaum A. G., Berlin, Germany, a corporation of Germany No Drawing. Application April 16, 1935, Serial No. 16,608. In Germany April 17, 1934

4 Claims. (Cl. 260—156)

This invention refers to new chemical products of therapeutical value and more particularly to heterocyclic azo compounds, and a method of making the same; and is a continuation in part of the U. S. Patent 1,862,361, patented June 7, 1932.

According to the method described in said patent dyestuffs with powerful bactericidal qualities are produced by coupling di-amino-pyridines with diazotized amino-compounds of the pyridine or quinoline series whose amino group does not possess tautomeric characteristics and which have at least one other substituent in addition to the amino group.

As coupling components 2,5- and 2,6-diamino pyridines were particularly mentioned.

It has now been discovered that azo dyestuffs of special activity can be obtained on causing the diazo compounds used in said patent to react with 3.5-diamino pyridine. In place of the 3.5-diamino pyridine, substitution products of the same, such as hydroxy, alkoxy, halogen, alkyl and the like derivatives, may also be used, provided, of course, that there remains at least one free or unsubstituted nuclear carbon atom.

In the production of these compounds, it must be considered very surprising from a chemical point of view that coupling takes place at all in the case of pyridines the 3- and 5-positions of which are occupied. For, according to the process described in the U. S. Patent No. 1,862,361, for instance, in the Examples 4 and 10, the diazotized 3-amino-6-chloro pyridine couples in the free 5-position, i. e. in ortho-position to further substituents of the 3-amino pyridine compound.

Hence, from the fact that compounds which do not possess such substituents, as for instance, 3-amino pyridine, do not couple at all, follows that the H-atom in 5-position is only rendered mobile by the presence of such a substituent whereby it is made capable of coupling in the 5-position. Thus, it could not be foreseen that the substituted pyridines used in the process claimed, in which the 5-position as well as the 3-position is occupied by an amino-group, would couple at all.

The following examples serve to illustrate the invention without, however, limiting the same to them:

Example 1

115 parts of 2-butoxy-5-amino pyridine, produced by reacting sodium butylate with 2-chlor-5-nitro pyridine in ethereal solution and reducing the 2-butyl hydroxy-5-nitro pyridine distilling at 153° C. and 14 mm. pressure, with stannous chloride, are diazotized and coupled with an ice-cooled hydrochloric acid solution of 54.5 parts of 3.5-diamino pyridine. The dyestuff obtained is precipitated by adding alkali thereto and recrystallized from methanol. The crystals have a melting point of 169–170° C.

Example 2

33 parts of 3.5-diamino pyridine are dissolved in hydrochloric acid. To this solution there is added a solution of 3.8 g. of 2-methoxy-5-amino pyridine which has been diazotized with 21 parts of sodium nitrite. The reaction mixture is rendered alkaline by addition of sodium hydroxide solution whereby the new dyestuff precipitates. By re-crystallization from alcohol a product is obtained in an appoximately quantitative yield and in the form of a yellow crystal powder having a melting point of 230° C.

Example 3

On replacing in Example 2 the 2-methoxy-5-amino pyridine by the equivalent quantity of 2-chloro-5-amino pyridine and proceeding in the same manner, a crystal powder is produced which after re-crystallization from alcohol, shows a melting point of 221° C.

Example 4

22 parts of 3-5-diamino pyridine are dissolved in hydro-chloric acid and cooled with ice. Thereto, an ice-cold solution of 34 parts of 8-amino quinoline, diazotized with 16 parts of sodium nitrite, is added. By slowly mixing with ammonia the desired dyestuff is obtained. It precipitates from alcohol in the form of blue-black crystals having a melting point of above 260° C.

Example 5

33 parts of 3.5-diamino pyridine are dissolved in hydrochloric acid. To this solution there is added a solution of 4.1 g. of 2-ethoxy-5-amino pyridine which has previously been diazotized with 21 parts of sodium nitrite. On adding sodium hydroxide solution so as to render the reaction mixture alkaline, the new dyestuff precipitates. It represents, after re-crystallization from alcohol a yellow powder having a melting point of 221° C. The yield is almost quantitative.

Of course many variations and changes may be made in the reaction conditions and other details disclosed in the foregoing specification by those skilled in the art without departing from the invention or sacrificing the advantages thereof and in accordance with the principles set forth herein and in the claims annexed hereto.

What we claim, is:

1. Heterocyclic azo compounds of the general formula $C_5H_2N(NH_2)_2$—N=N—R, wherein the $NH_2$ groups are in the 3 and 5 positions and R is a radical taken from the class consisting of pyridyle and quinolyl, said compounds being colored substances and forming water-soluble salts with mineral acids.

2. The 2-butoxy-pyridyl-5 azo-3', 5'-diamino-pyridin, having a melting point of about 169°–170° C.

3. The 2-ethoxy-pyridyl-5 azo-3', 5'-diamino-pyridin, having a melting point of about 221° C.

4. The 2-methoxy-pyridyl-5 azo-3', 5'-diamino-pyridin, having a melting point of about 230° C.

OTTO von SCHICKH.
ARTHUR BINZ.